(12) United States Patent
Chen

(10) Patent No.: US 6,433,873 B1
(45) Date of Patent: Aug. 13, 2002

(54) IMAGE-SPLITTING COLOR METER

(75) Inventor: Chun-Yen Chen, Hsinchu Hsien (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 09/436,150

(22) Filed: Nov. 9, 1999

(30) Foreign Application Priority Data

Aug. 30, 1999 (TW) ........................................ 88114801 A

(51) Int. Cl.$^7$ .................................................. G01J 3/51
(52) U.S. Cl. ........................ 356/406; 356/407; 356/419; 250/226
(58) Field of Search ................................. 356/402, 405, 356/406, 407, 416, 419; 359/639, 640; 358/512; 209/580, 581, 582; 250/226; 348/191

(56) References Cited

U.S. PATENT DOCUMENTS 6,191,859 B1 * 2/2001 Winterbottom et al. ...... 356/406

* cited by examiner

*Primary Examiner*—F L Evans
(74) *Attorney, Agent, or Firm*—J. C. Patents

(57) ABSTRACT

An image-splitting color meter. The image-splitting color meter is added at an entrance pupil of a light coming from an observing object to obtain a high uniformity and a high efficiency. The image-splitting device can split the entrance pupil into several partitions for light splitting and color filtering. The split light beams are then converged and focused onto a photodetective plane.

18 Claims, 10 Drawing Sheets

(4 of 10 Drawing Sheet(s) Filed in Color)

IMAGE-SPLITTING COLOR METER

CROSS-REFERENCE TO RELATED APPLICATION

This application claims the priority benefit of Taiwan application serial no. 88114801, filed Aug. 30, 1999.

BACKGROUND OF THE INVENTION

1. Field of the Invention

The invention relates in general to a color meter. More particularly, this invention relates to an imaging-splitting color meter at an optical entrance pupil.

2. Description of the Related Art

To inspect the quality of color, a color meter has been broadly applied to various industries as an instrument for quality inspection and management of color. Referring to FIG. 1, a conventional color meter is schematically illustrated. An observing object 10 reflects a light beam after being incident with a light source, for example, a light emitting diode (LED) or a television screen. This incident light source is converged by a converging lens 20 and restricted by an entrance pupil 30, and then forms an image on a photodetective plane 40. The observing object 10 and the photodetective plane 40 are conjugate image points, that is, the observing object 10 is an object plane of the optical system, while the photodetective plane 40 is the image plane of the optical system.

After the photodetective plane 40, multiple photosensors 50 are disposed. As shown in FIG. 1, color filtering devices 80 (color filters in general) are used to filter red light (R), green light (G), and blue light (B). Being filtered, these lights are then received by the photosensors 50 which can also detect the light intensity of these lights. Therefore, different signals are generated according to various colors with different light intensities. These signals are then transmitted from an amplifier 60 to an electronic system 70, the color of the observing object 10 can thus be measured and calculated.

The chromaticity of three colors R, G and B are calculated by the electronic system 70 according to the intensities of the light signals thereof. Different methods of color filtering have been developed currently, for example, $\overline{x}_a$, $\overline{x}_b$, $\overline{y}$ and $\overline{z}$ coloring filters of human vision; red (R), yellow (Y), green (G), cyan (C) and blue (B) color filtering method; and visible range multi-wavelength color filtering method. These above functions can be achieved using photosensors of different observing objects.

In FIG. 2, assuming that the observing object A is partitioned into three portions a1, a2 and a3, and an image of the object A is formed onto the photodetective plane 40, that is, on B. The photodetective plane B is also partitioned into three portions b1, b2 and b3 to dispose photosensors for R, G and B lights, respectively. If the colors are uniformly distribute over the object A, the distribution of lights on the photodetective plane B is substantially uniform as well. Under this circumstance, the arrangement of the photosensors of various colors would not be affected. However, if the color distribution in the portions a1, a2 and a3 of the object A is non-uniform, and consequently the color distribution of the portions b1, b2 and b3 is non-uniform, the arrangement of the photosensors is then impacted.

For example, human eyes are synthetically uniform against color. Therefore, the color of the object A observed by the human eyes is an average of the colors in A, that is, an average $a_{ave}$ of a1, a2 and a3. In the photodetective plane B, b1 receives the light from a1, b2 receives the light from a2 and b3 receives the light from a3. When the position of the photosensors is out of place, the color calculated is not equal to an average value $b_{ave}$ of b1, b2 and b3. Thus, the color detected by the photosensors is not real.

Referring to FIG. 3, a non-uniform color distribution of an object is illustrated. Assuming that the signals R=B=G, that is, a1=a3=a3, the color $a_{ave}$ that the observer sees is white.

FIG. 4 and FIG. 5 illustrate a result of a poor arrangement of photosensors in the photodetective plane. The red dash line circles the location of a red color filtering device and a red photosensor. The green dash line circles the location of a green color filtering device and a green photosensor, and the blue dash line circles the location of blue color filtering device and a blue photosensor.

In FIG. 4, only blue light can transmit through the blue color filtering device to be received by the blue photosensor. The green light can not pass through the red color filtering device, so that the red photosensor can not receive any signal. The red light cannot pass through the green color filtering device, so that there is nothing received by the green photosensor. As a result, being analyzed by the electronic system, the light of the object is blue instead of white.

In FIG. 5, the photosensors are turned with an angle. A small portion of the blue light can pass through the blue color filtering device and received by the blue photosensor. An even smaller portion of the red light can pass through the red color filtering device to be received by the red photosensor. However, both of the blue light and the red light can not transmit through the green color filtering device, so that the green photosensor can not detect any signal. Being analyzed by the electronic system, the object is in purple color instead of being white.

Therefore, when the color distribution of an object to be observed is non-uniform, the arrangement of photosensors greatly affects the analysis of the electronic system. The above problems happen to the color inspection of textile, fabric, ceramic tiles with uneven surface or metal.

To resolve the above problems, methods have been proposed such as:

(a) Using a diffuser:

Referring to FIG. 6, a diffuser is used between the entrance pupil 30 and the photodetective plane 40 to mitigate the effect caused by non-uniform color distribution. The diffuser, though improves the uniformity, reduces the efficiency of light due to the diffusion.

(b) Using a photoconductive optic fiber:

Referring to FIG. 7, photoconductive optic fiber is disposed on the photodetective plane 40. The light focused onto the photodetective plane 40 is coupled into the photoconductive optic fiber to be conducted into various color filtering device 80 to the corresponding sensors 50. Again, this method greatly enhances the uniformity but reduces the efficiency of light.

(c) Using an integrating sphere:

Referring to FIG. 8, an integrator sphere is installed on the photodetective plane 40. The light converged at the photodetective plane 40 is conducted into the integrator sphere 110, and passes through the color filtering device 80 to reach the photosensors 50. This method uses scattering of light to improve the uniformity. Though the improvement of uniformity is the best among these methods, the efficiency is poor, and the cost is high, the volume is large.

SUMMARY OF THE INVENTION

The invention provides an image-splitting color meter. An image splitting device is disposed at an entrance pupil to improve the uniformity of light with a high efficiency.

The image-splitting color meter provided by the invention comprises a light converging device, an image-splitting device, multiple color filtering devices and a photosensor including multiple color sense devices. The light converging device is used to restrict an incoming light beam from an observing object. The image-splitting device is disposed at an entrance pupil to split the incoming light beam into multiple split light beams. The color filtering devices are used to receive the split light beams, so as to convert these split light beams into corresponding color light beams. The color sensors receive the corresponding color light beams and transform these color light beams into electrical signals.

Both the foregoing general description and the following detailed description are exemplary and explanatory only and are not restrictive of the invention, as claimed.

BRIEF DESCRIPTION OF THE DRAWINGS

The file of this patent contains four drawings executed in color. Copies of this patent with color drawings will be provided by the Patent and Trademark Office upon request and payment of the necessary fee.

DESCRIPTION OF THE PREFERRED EMBODIMENTS

Figure 1:
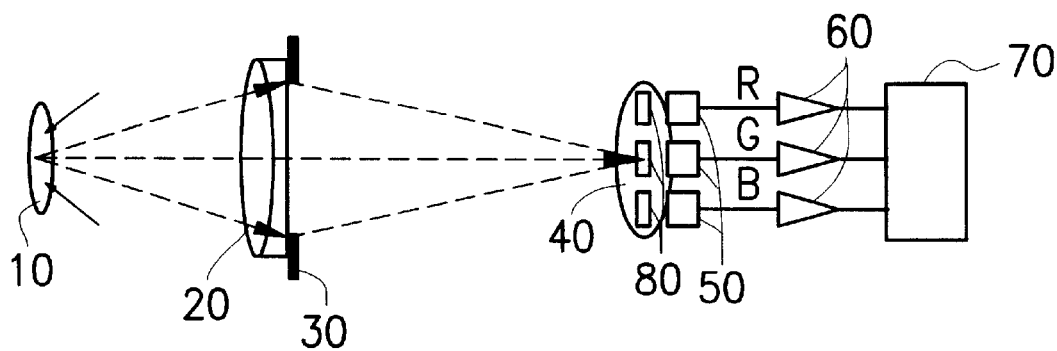
FIG. 1 shows a conventional color meter.
Figure 2:
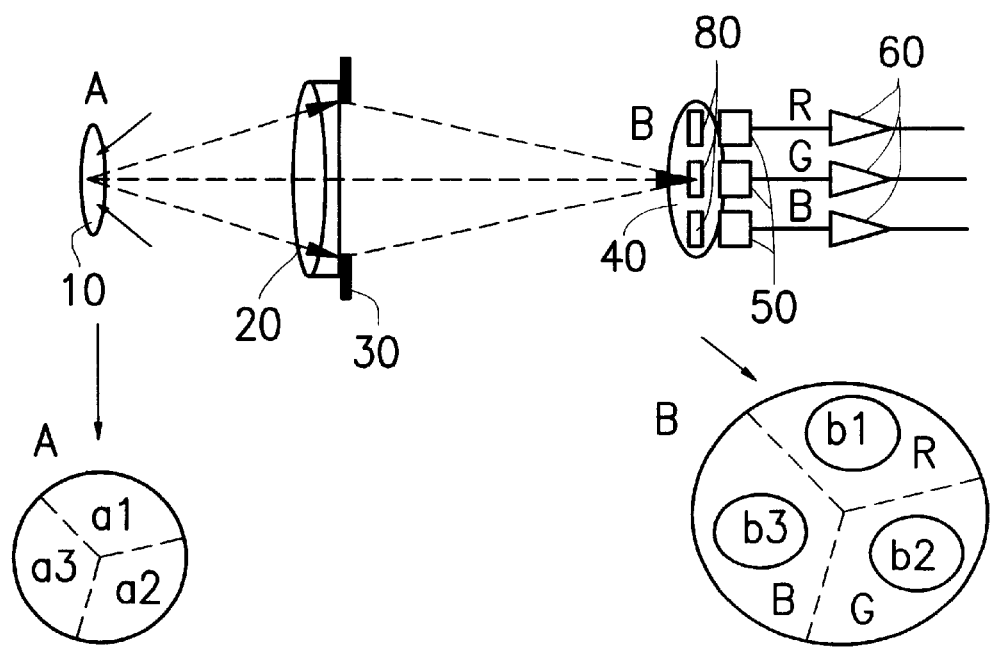
FIG. 2 show a light distribution in the portions a1, a2 and a3 of an observing object A, and the receiving distribution in the portions b1, b2 and b3 of the photodetective plane.
Figure 3:
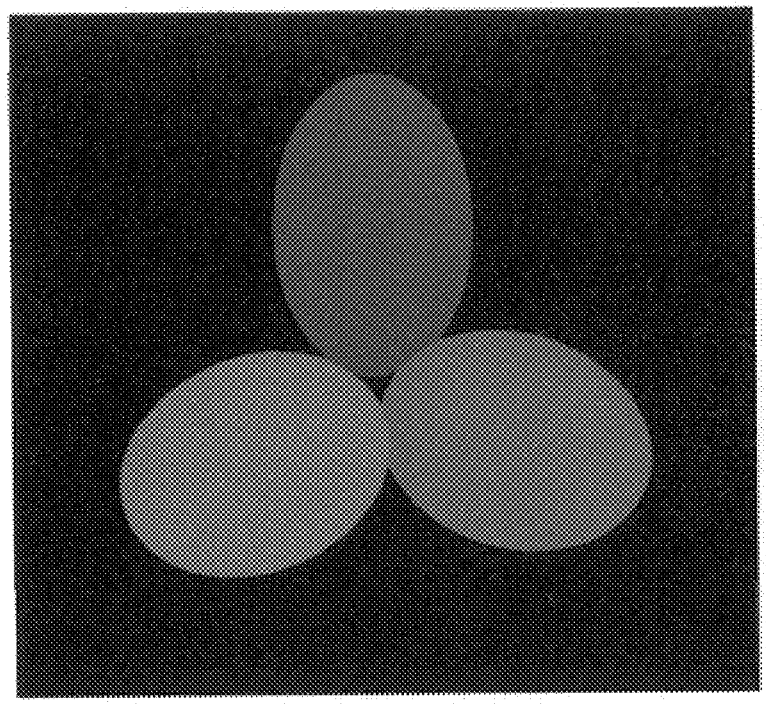
FIG. 3 shows a circumstance of a non-uniform color distribution of an observing object.
Figure 4:
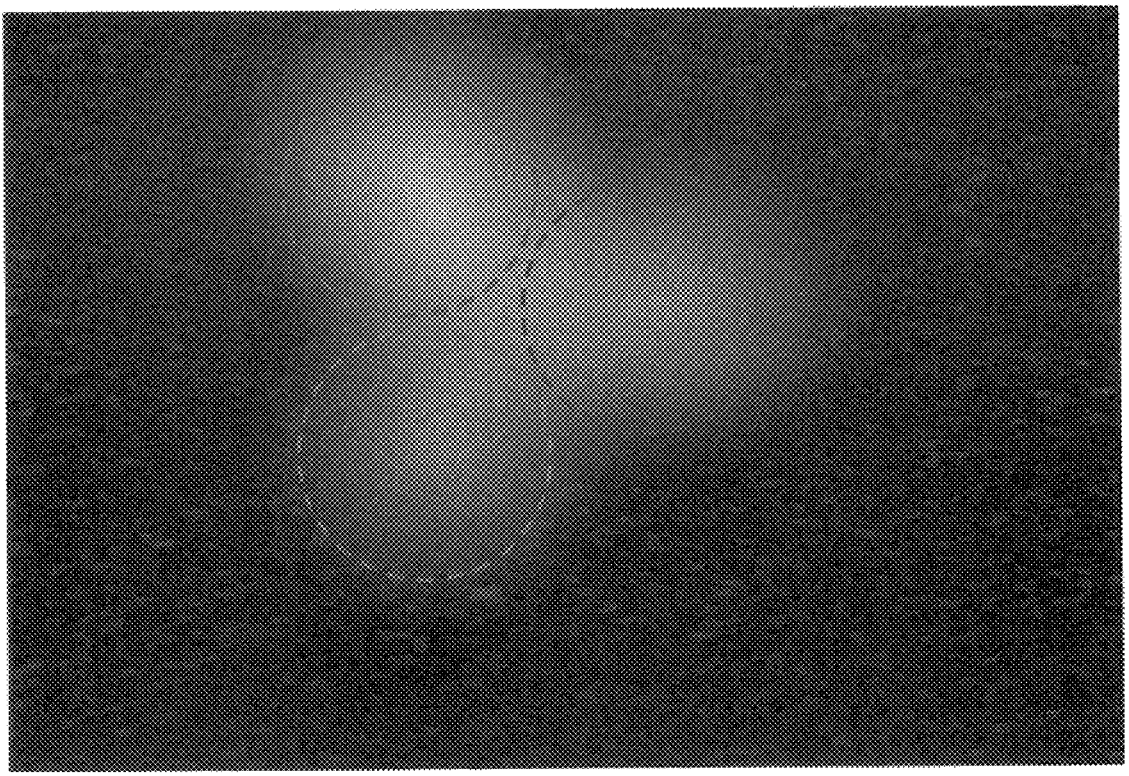
FIG. 4 shows a poor arrangement of photosensors on a photodetective plane in the prior art.
Figure 5:
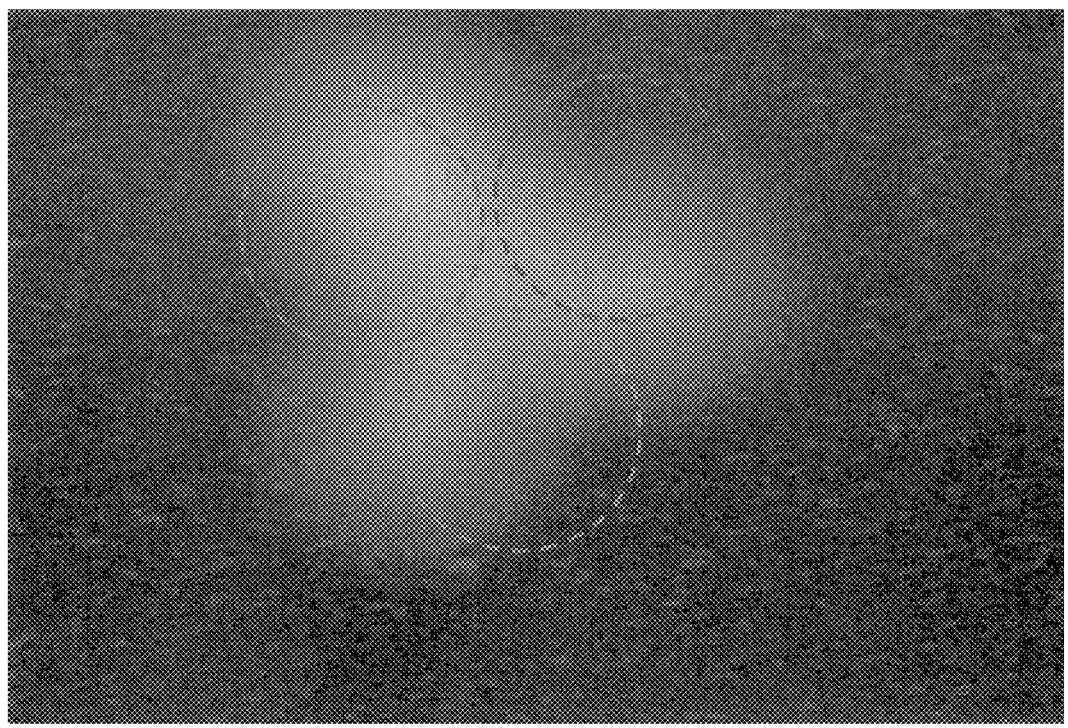
FIG. 5 shows another poor arrangement of photosensor on a photodetective plane in the prior art.
Figure 6:
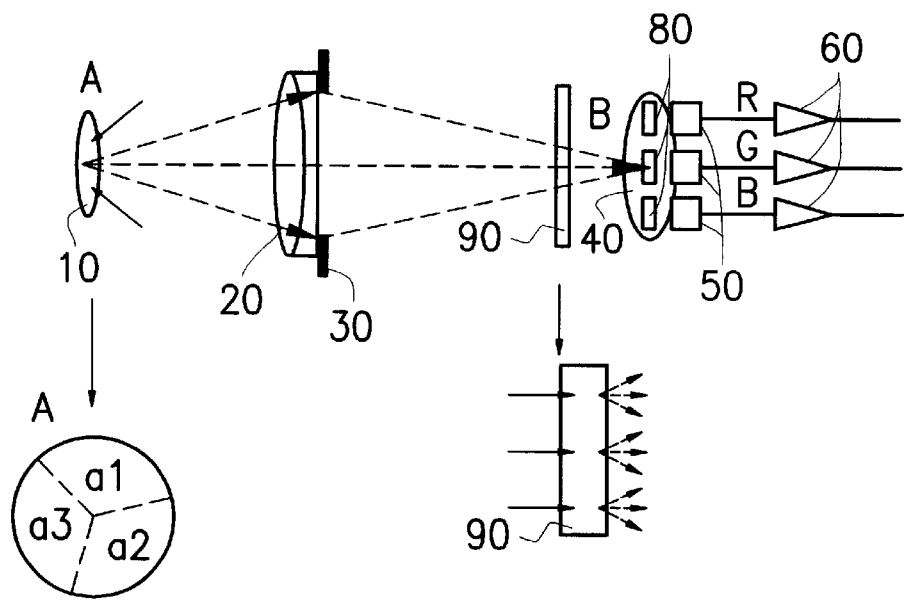
FIG. 6 illustrates an arrangement of disposing a diffuser between the entrance pupil and the photodetective plane in a conventional color meter.
Figure 7:
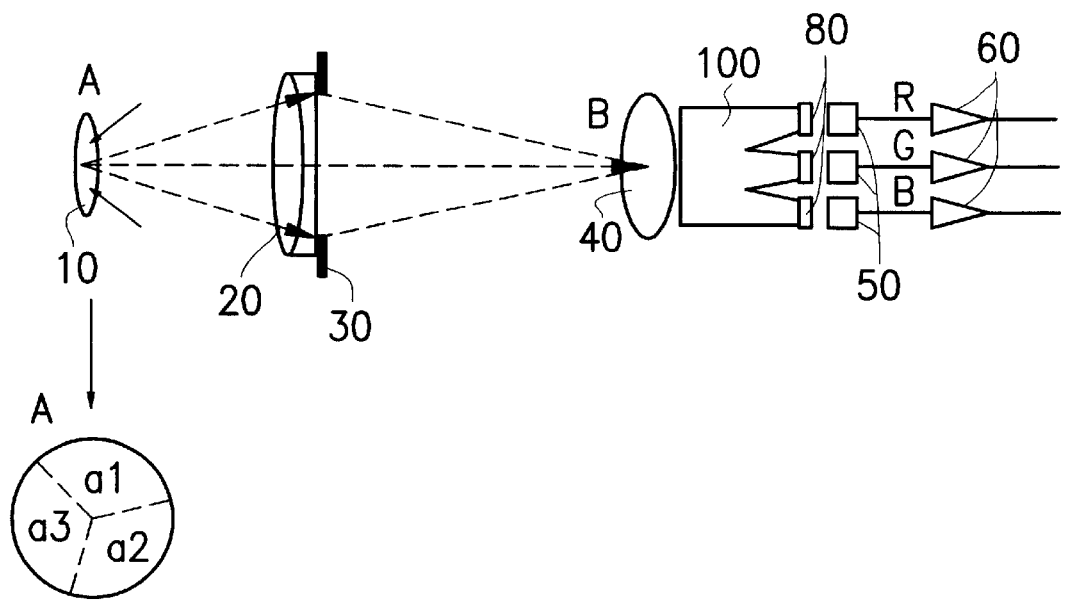
FIG. 7 illustrate an arrangement of disposing a photoconductive optic fiber on the photodetective plane in a conventional color meter.
Figure 8:
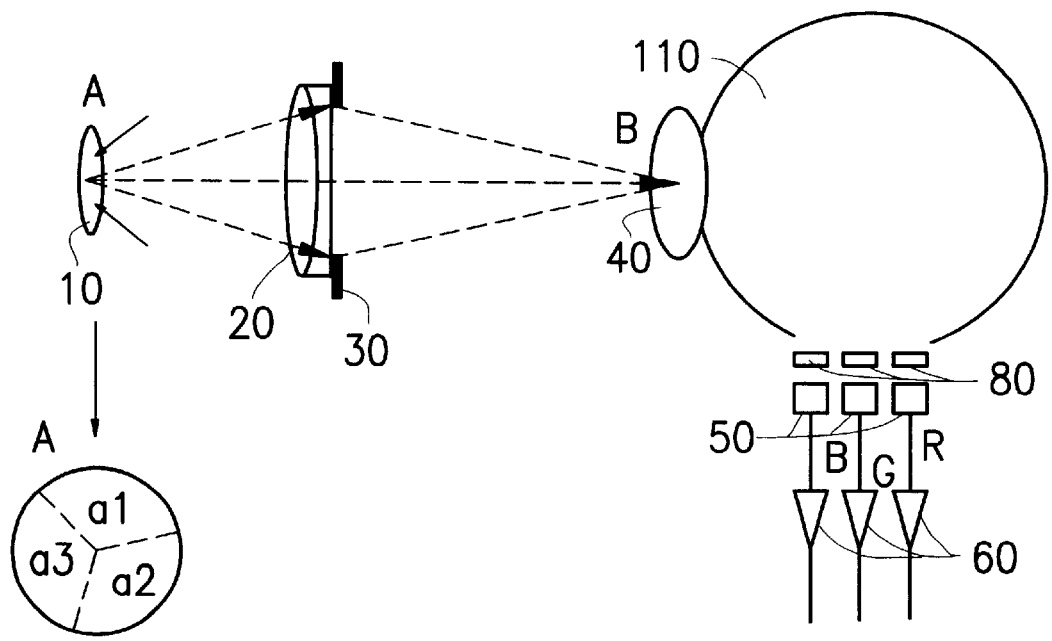
FIG. 8 illustrate an arrangement of disposing an integrating sphere on a photodetective plane in the prior art.
Figure 9:
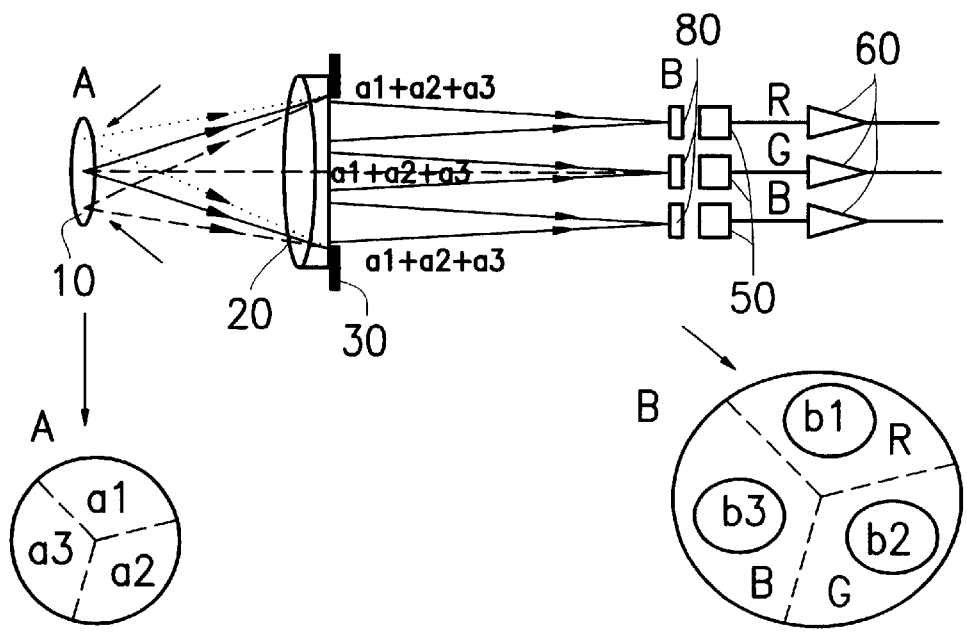
FIG. 9 shows an image-splitting color meter according to an embodiment of the invention.

Referring to FIG. 9, a schematic drawing of an image-splitting color meter is shown. Being converged by a converging device, light reflected from an observing object 10, or a light illuminated from the object 10, is split at an entrance pupil 30 using an image splitting device. Therefore, multiple light beams are received at a light sense region. The multiple light beams reflect the color distribution in portion a1, a1 and a3 of the observing object 10, whether uniform or non-uniform. After reaching the color filtering devices 80, various color light beams are generated. A photosensor 50 comprising multiple color sense devices is used to receive various color light beams, so as to convert the color light beams into electrical signals. These signals are then amplified by an amplified and output. In the invention, each color filtering device in portions b1, b2 and b3 can receive colors of the portions a1, a2 and a3 without being restricted by the arrangement to resolve the drawback of the conventional design.

Figure 10A:
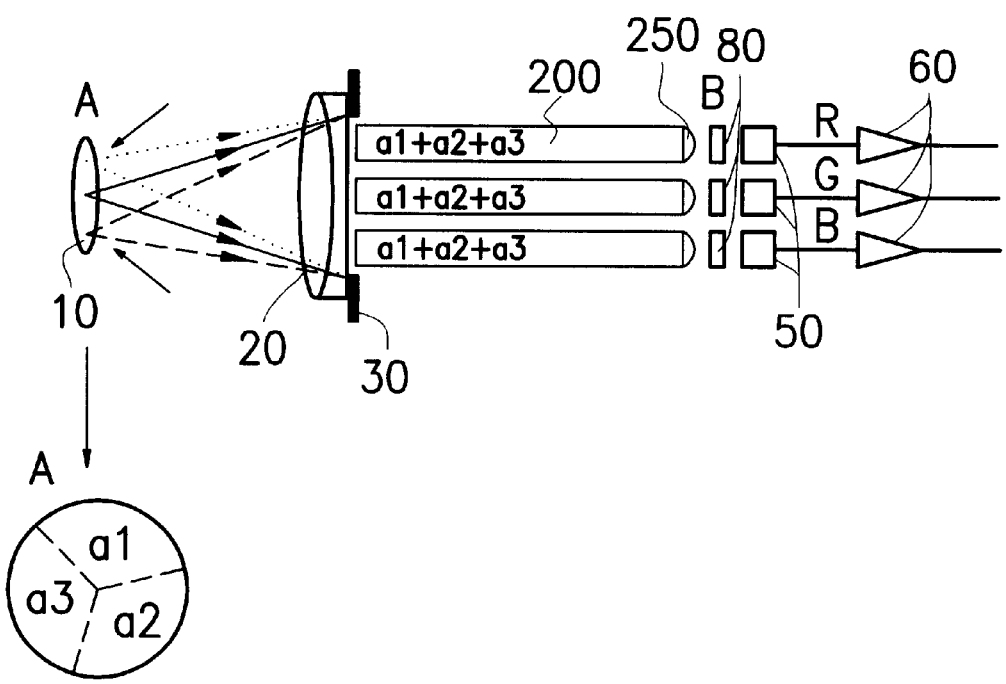
FIG. 10A shows a first embodiment of the invention that uses a photoconductive tube as the image-splitting device.
Figure 10B:
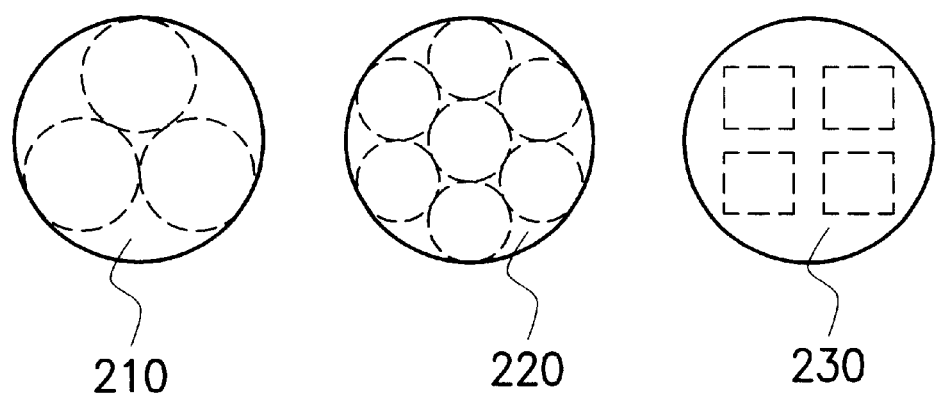
FIG. 10B illustrate the arrangement of the photoconductive tube used in the first embodiment of the invention.

Referring to FIG. 10A, in a first embodiment of the invention, a photoconductive tube 200 is used as the image-splitting device. When the light from the object 10(A) is converged by a converging device 20, the converged light is split by the photoconductive tube 200 while reaching the entrance pupil 30. The material to fabricate the photoconductive tube 200 includes glass optical material, plastic optical material, liquid optical material or fiber. The arrangement of an input side of the photoconductive tube 200 is designed as specific requirement, and can be referred to the cross sectional patterns of 210, 220 and 230 as shown in FIG. 10B. For the pattern 210, the photoconductive tube 200 includes three tubes of which the cross sections are in circular shape with identical dimension parallel and contiguous with each other. For the pattern 220, the photoconductive tube 200 comprises seven contiguous tubes with circular cross section of an identical size. In the pattern 230, the photoconductive tube 200 comprises tubes in rectangular shape with the same size. The tubes are separate and equidistant from a center of the entrance pupil. The light beam of the object 10 is split into multiple light beams, while the number and the arrangement of the photoconductive tube 200 is dependent on the number of the photosensors 80. Being split, different split lights beam are led to different color filtering devices 80 from the output side of the photoconductive tube 200. A photoconductive converging device 250 is disposed in front of the color filtering devices 80 to focus the split lights, and the color light beams generated by the color filtering devices 80 are then received by the photosensors 50.

In the first embodiment, the color filtering devices 80 can be formed by directly formed onto an output side of the photoconductive tubes 200 by optical coating or printing. Or alternatively, the color filtering devices 80 can even be optically coated or printed on the input side of the photoconductive tubes 200. In this manner, the light from the observing object can be split into multiple filtered color light beams and led to different photosensors 50. Again, the photoconductive converging device 250 is used to focus the color light beams before being received by the photosensors 50.

Figure 11A:
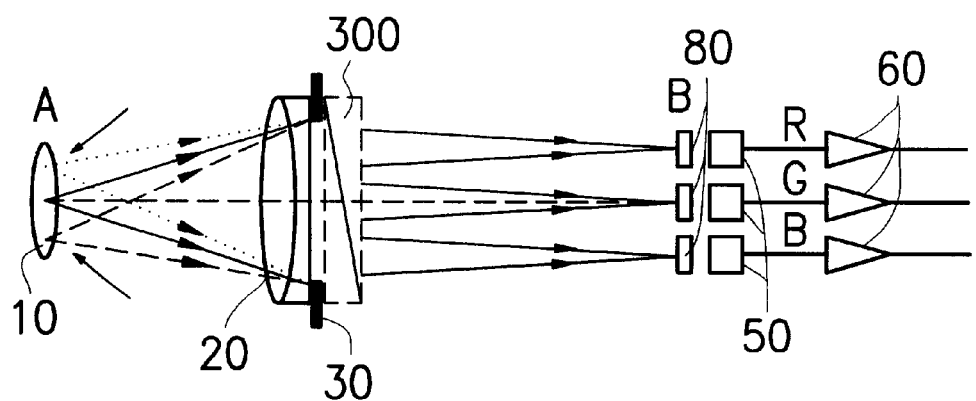
FIG. 11A shows a second embodiment of the invention that uses a multi-image prism as the image-splitting device.
Figure 11B:
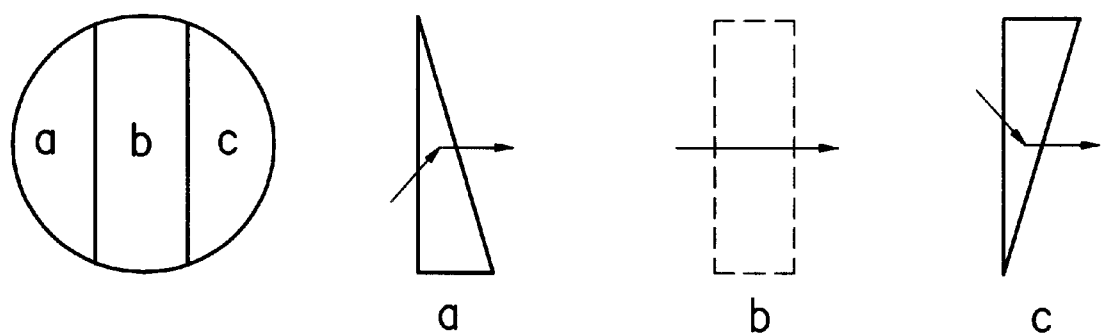
FIG. 11B illustrate the arrangement of the multi-image light-splitting prism used in the second embodiment of the invention in which the theory of refraction is applied to split the light of the observing object.

In FIG. 11A, a multi-image light splitting prism is used as the image-splitting device in a second embodiment of the invention. The multi-image light splitting prism 300 is disposed at an entrance pupil of light from an observing object 10(A). As shown in FIG. 11B, the multi-image light splitting prism comprises three wedged prisms a, b and c. Using optical refraction theory, the light of the object is split into multiple light beams. While the multiple light beams reaching the color filtering devices 80, color light beams are generated and are to be received by the photosensors 50. The color filtering device can be directly optically coated or printed on the wedged prism.

Figure 12:
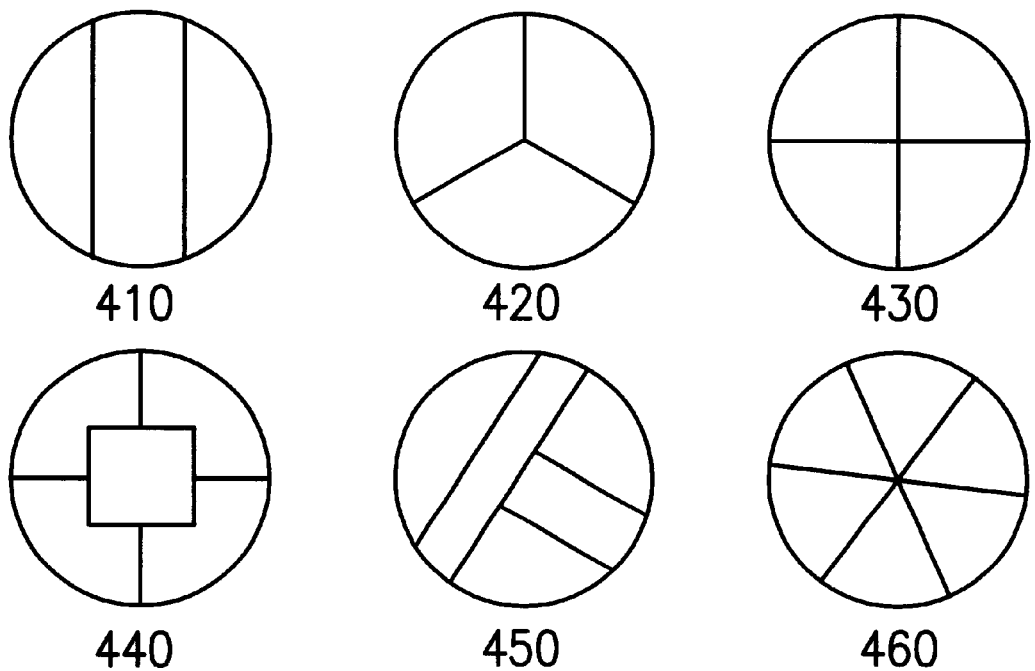
FIG. 12 shows a third embodiment of the invention that uses a muiti-image light-splitting lens as the image-splitting device.

In FIG. 12, a third embodiment of the invention is shown. A multi-image light splitting lens is used. Examples of the patterns of the multi-image light splitting lens can be referrer to 410, 420, 430, 440, 450 and 460. The multi-image light splitting is die-cast by lens with different optical axes. For example, the multi-image light-splitting lens may have the pattern 420 which is equipartitioned into three portions with three individual optical axes. Therefore, when a light passes through the multi-image light splitting lens with the pattern 420, three equidistant split images are resulted. The design of the pattern of the multi-image light splitting lens is determined according to specific requirement of the optical system of the color meter in a practical application.

Being split by the multi-image light splitting lens, the split light then passes through the respective color filtering device to generate color light beams.

The color filtering device can be directly optically coated or printed on the portions of the multi-image light splitting lens.

Figure 13:
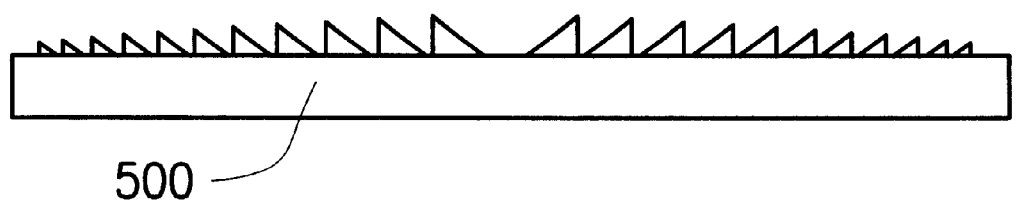
FIG. 13 shows a fourth embodiment of the invention that uses a holographic optical element as the image-splitting device.

FIG. 13 shows the fourth embodiment using a holographic optical element 500 as the image splitting device. On the holographic optical element 500, knurls are formed to have a similar effect of an optical gate, so as to split the light of the observing object.

Figure 14:
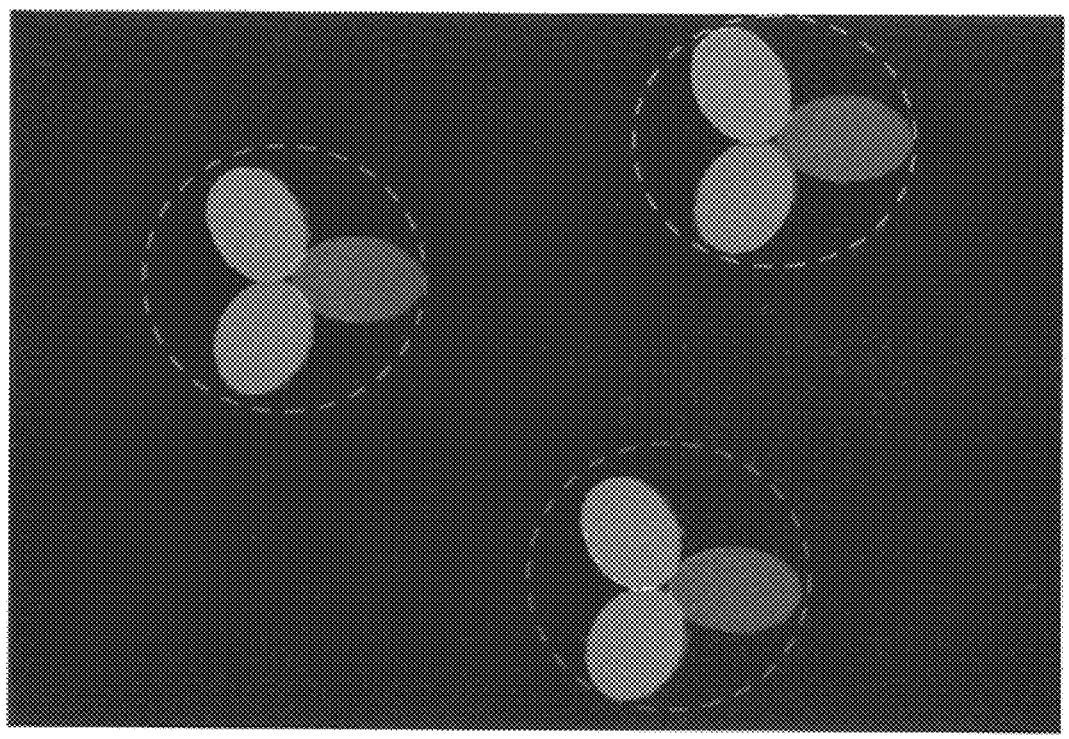
FIG. 14 shows a resulting image of an observing object formed on the photodetective plane with light splitting at the entrance pupil.

FIG. 14 shows an observing result of an object on a photodetective plane. As shown in the figure, even non-uniformly distributed, different color light can form a clear and distinguishable color image on the photodetective plane and the color sense device. Therefore, in the blue dash line region, green and red lights are filtered out to remain only blue light to pass through and to be received by the blue light sensor. In the green dash line circle, only green light passes through the green light filtering device to be received by the green light sensor. Similarly, in the red dash line circle, only red light passes through the red light filtering device to be received by the red light sensor. As a result, the electrical signals of these three sensors to transmitted by an electronic system to be analyzed to obtain a white color.

Table 1 shows a comparison of color meters between the prior art and the invention. From Table, it is found that the invention provides a color meter with a high uniformity, high efficiency of light, small dimension and an optimized signal-to-noise ratio (S/N ratio).

TABLE 1

|  | Using Diffuser | Using Light Conducted Optical Fiber | Using Integrating Sphere | Imaging-split and light split at entrance pupil |
|---|---|---|---|---|
| Uniformity | Ordinary | Good | Optimized | Good |
| Light Efficiency | Ordinary | Ordinary | Optimized | Good |
| Dimension | Small | Medium | Large | Small |
| Cost | Small | Medium | Large | Small |
| Productivity | Easy | Medium | High | Low |
| Signal to Noise Ratio | Ordinary | Ordinary | Ordinary | Optimum |

Other embodiments of the invention will appear to those skilled in the art from consideration of the specification and practice of the invention disclosed herein. It is intended that the specification and examples to be considered as exemplary only, with a true scope and spirit of the invention being indicated by the following claims.

What is claimed is:

1. An image splitting color meter used to observe a color of an object, the color meter comprising:
   a converging device, to converge an incoming light beam from the object and to restrict the light beam;
   an image-splitting device, disposed at an entrance pupil of the light beam to split the light beam into a plurality of split light beams;
   a plurality of color filtering devices, to filter the split light beams to generate a plurality of color filtered light beams; and
   a photosensor, including a plurality of color sense devices to convert the color filtered light beams into a plurality of electrical signals.

2. The color meter according to claim 1, wherein the image-splitting device includes a plurality of photoconductive tubes with an input end to receive the incoming light beam of the object and an output end to output the split light beams.

3. The color meter according to claim 2, wherein the color filtering devices are formed on an output side of the photoconductive tubes using optical coating.

4. The color meter according to claim 2, wherein the color filtering devices are formed on an output side of the photoconductive tubes using printing.

5. The color meter according to claim 2, wherein the photoconductive tubes are made of one of the materials including glass optical material, plastic optical material, liquid optical material and optical fiber.

6. The color meter according to claim 2, comprising further a plurality of photoconductive converging devices disposed between an output of the photoconductive tubes and the color filtering devices.

7. The color meter according to claim 2, wherein the color filtering devices are formed on the input end of the photoconductive tubes to receive the incoming light beams, so that the color filtered light beams are generated at the output end of the photoconductive tubes.

8. The color meter according to claim 7, wherein the color filtering devices are formed on the input end of the photoconductive tubes using optical coating.

9. The color meter according to claim 7, wherein the color filtering devices are formed on the input end of the photoconductive tubes using printing.

10. The color meter according to claim 7, wherein the photoconductive tubes are made of one of the materials including glass optical material, plastic optical material, liquid optical material and optical fiber.

11. The method according to claim 7, comprising further a plurality of photoconductive converging elements disposed between the output end of the photoconductive tubes and the color sense devices to converge the color filtered light beams.

12. The color meter according to claim 1, wherein the image-splitting device comprises a multi-image light splitting prism including a plurality of wedged prisms, so as to split the incoming light beam into the split light beams which further pass through the color filtering devices to generate the color filtered light beams.

13. The color meter according to claim 12, wherein the color filtering devices are formed on the prisms using optical coating.

14. The color meter according to claim 12, wherein the color filtering devices are formed on the prisms using printing.

15. The color meter according to claim 1, wherein the image-splitting device comprises a multi-image light splitting lens unit including a plurality of lenses with different optical axes, so as to split the incoming light beam into the split light beams which further pass through the color filtering devices to generate the color filtered light beams.

16. The color meter according to claim 15, wherein the color filtering devices are formed on the lenses using optical coating.

17. The color meter according to claim 15, wherein the color filtering devices are formed on the lenses using printing.

18. The color meter according to claim 1, wherein the image-splitting device comprises a holographic optical element to split the incoming light beam into the split light beams which further pass through the color filtering devices to generate the color filtered light beams.

* * * * *